United States Patent
Mcgahee

(10) Patent No.: US 11,383,278 B2
(45) Date of Patent: Jul. 12, 2022

(54) CLEANING COKE DEPOSITS FROM PROCESS EQUIPMENT

(71) Applicant: Chevron Phillips Chemical Company LP, The Woodlands, TX (US)

(72) Inventor: Vincent dePaul Mcgahee, Kemah, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/173,468

(22) Filed: Feb. 11, 2021

(65) Prior Publication Data
US 2021/0162471 A1    Jun. 3, 2021

Related U.S. Application Data

(60) Continuation of application No. 16/371,401, filed on Apr. 1, 2019, now Pat. No. 10,953,443, which is a
(Continued)

(51) Int. Cl.
*B08B 9/055* (2006.01)
*F28G 1/12* (2006.01)
(Continued)

(52) U.S. Cl.
CPC ............ *B08B 9/045* (2013.01); *A46B 3/20* (2013.01); *A46B 5/00* (2013.01); *A46B 9/028* (2013.01);
(Continued)

(58) Field of Classification Search
CPC ......... B08B 9/045; B08B 9/053; B08B 9/055; B08B 9/0553; B08B 9/0554;
(Continued)

(56) References Cited

U.S. PATENT DOCUMENTS 2,917,762 A * 12/1959 Xenis ................. F28G 1/02
254/134.6
2,972,156 A * 2/1961 Burton ................. B08B 9/0553
15/104.19
(Continued)

FOREIGN PATENT DOCUMENTS

CN          2488609       5/2002
CN        101228296       7/2008
(Continued)

OTHER PUBLICATIONS

Plastic Engineering Handbook (vol. 1), Rui Huang, China Machine Press, pp. 1225-1226, Apr. 2000.
(Continued)

*Primary Examiner* — Randall E Chin
(74) *Attorney, Agent, or Firm* — Conley Rose, P.C.; Rodney B. Carroll; Monte R. Rhodes

(57) ABSTRACT

A method for cleaning a coke deposit from an internal surface of a process equipment, comprising removing at least a portion of the coke deposit from the internal surface using a flexible pig comprising a plurality of bristles, without damaging a metal protective layer of the internal surface of the process equipment. A flexible pig for cleaning a coke deposit from an internal surface of a process equipment without damaging a metal protective layer of the internal surface, comprising a flexible body formed of a polymeric material, and a plurality of bristles partially encapsulated by the polymeric material of the flexible body.

18 Claims, 3 Drawing Sheets

Related U.S. Application Data division of application No. 15/142,792, filed on Apr. 29, 2016, now Pat. No. 10,279,380.

(51) Int. Cl.

| | | |
|---|---|---|
| *B08B 9/053* | (2006.01) | |
| *B08B 1/00* | (2006.01) | |
| *F16L 55/40* | (2006.01) | |
| *B08B 9/045* | (2006.01) | |
| *C10G 35/24* | (2006.01) | |
| *A46B 3/20* | (2006.01) | |
| *A46B 5/00* | (2006.01) | |
| *A46B 9/02* | (2006.01) | |
| *C10B 43/06* | (2006.01) | |
| *F16L 101/12* | (2006.01) | |

(52) U.S. Cl.
CPC .............. *B08B 1/002* (2013.01); *B08B 9/053* (2013.01); *B08B 9/055* (2013.01); *B08B 9/0553* (2013.01); *B08B 9/0557* (2013.01); *C10B 43/06* (2013.01); *C10G 35/24* (2013.01); *F16L 55/40* (2013.01); *F28G 1/12* (2013.01); *F28G 1/125* (2013.01); *A46B 2200/3013* (2013.01); *F16L 2101/12* (2013.01)

(58) Field of Classification Search
CPC .................. B08B 9/0557; B08B 1/002; A46B 2200/3013; F16L 55/40; F16L 2101/12; F28G 1/12; F28G 1/125
See application file for complete search history.

(56) References Cited

U.S. PATENT DOCUMENTS

| | | | |
|---|---|---|---|
| 3,875,606 A * | 4/1975 | Landers | F17D 3/14 15/104.061 |
| 4,016,620 A | 4/1977 | Powers | |
| 4,406,031 A | 9/1983 | Eimer | |
| 4,506,401 A | 3/1985 | Knapp | |
| 4,720,884 A | 1/1988 | Ralls | |
| 4,825,498 A | 5/1989 | Rankin | |
| 4,907,314 A | 3/1990 | Kershaw | |
| 5,406,014 A | 4/1995 | Heyse | |
| 5,413,700 A | 5/1995 | Heyse | |
| 5,528,790 A | 6/1996 | Curran | |
| 5,593,571 A | 1/1997 | Heyse | |
| 5,625,917 A | 5/1997 | Hawkins | |
| 5,674,376 A | 10/1997 | Heyse | |
| 5,676,821 A | 10/1997 | Heyse | |
| 5,795,402 A | 8/1998 | Hargett, Sr. | |
| 5,807,842 A | 9/1998 | Buscemi | |
| 5,849,969 A | 12/1998 | Heyse | |
| 6,014,789 A | 1/2000 | Knapp | |
| 6,170,493 B1 | 1/2001 | Sivacoe | |
| 6,190,539 B1 | 2/2001 | Holtermann | |
| 6,419,986 B1 | 7/2002 | Holtermann | |
| 6,500,271 B1 | 12/2002 | Moore | |
| 6,548,030 B2 | 4/2003 | Heyse | |
| 6,551,660 B2 | 4/2003 | Holtermann | |
| 7,542,874 B2 | 6/2009 | Bondurant | |
| 7,827,646 B2 | 11/2010 | Pruett | |
| 8,119,203 B2 | 2/2012 | Hise | |
| 8,535,448 B2 | 9/2013 | Holtermann | |
| 8,728,246 B2 | 5/2014 | Varrin, Jr. | |
| 8,894,772 B2 | 11/2014 | Phipps | |
| 9,649,661 B2 | 5/2017 | Broze | |
| 2002/0011124 A1 | 1/2002 | Phipps | |
| 2006/0275551 A1 | 12/2006 | Hise | |
| 2009/0098289 A1 | 4/2009 | Deininger | |
| 2009/0165227 A1 | 7/2009 | Phipps | |
| 2010/0205757 A1 | 8/2010 | Munden | |
| 2011/0203676 A1 | 8/2011 | Been | |
| 2013/0276828 A1 | 10/2013 | Phipps | |
| 2014/0013872 A1 | 1/2014 | Thursby | |
| 2014/0246013 A1 | 9/2014 | Chun | |

FOREIGN PATENT DOCUMENTS

| | | |
|---|---|---|
| CN | 202570697 U | 12/2012 |
| CN | 203725447 U | 7/2014 |
| CN | 204234427 | 4/2015 |
| CN | 104588380 | 5/2015 |
| DE | 29907103 | 7/1999 |
| EP | 0300602 | 1/1989 |

OTHER PUBLICATIONS

International Search Report and Written Opinion, PCT/US2017/029514, dated Aug. 31, 2017, 12 pages.

Roberts, Rich, "Heater Tube Inspection and Remnant Life Evaluation," Inspectioneering Journal, May/Jun. 2014, pp. 38-39 plus 1 cover page and 1 information page, vol. 20, Issue 3.

Roberts, Richard D., "New Technology Allows Access to Coils with Common Headers in the Process Industry," Inspectioneering Journal, Nov./Dec. 2012, pp. 20-21.

Shen Shaohua, General Chemistry, Published Aug. 31, 2012, pp. 125-126.

* cited by examiner

CLEANING COKE DEPOSITS FROM PROCESS EQUIPMENT

CROSS-REFERENCE TO RELATED APPLICATIONS

This application is a continuation of and claims priority to U.S. patent application Ser. No. 16/371,401 filed Apr. 1, 2019, published as U.S. Patent Application No. US 2019/0224726 A1, now U.S. Pat. No. 10,953,443, which is a divisional of and claims priority to U.S. patent application Ser. No. 15/142,792 filed Apr. 29, 2016, now U.S. Pat. No. 10,279,380, and both entitled "Cleaning Coke Deposits from Process Equipment," each of which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to cleaning coke deposits from process equipment using a pig.

BACKGROUND

The operation of chemical processes and the reactions involved therewith may generally result in the deposition of coke and growth of coke blooms on the internal surfaces of process equipment. The presence of coke increases the temperature of the internal surfaces which results in carburization and metal loss of the internal surfaces. For example, catalytic reforming reactions which involve the conversion of naphtha hydrocarbons to reformate may foul the internal surfaces of furnace tubes with coke including at least one or more of catalytic coke and thermal coke. These initial coke deposits may grow over time into coke blooms. The service life of the process equipment is negatively impacted by the carburization and metal loss which results from coke blooms.

Metal protective layers (for example a stannide layer) may protect the internal surface of the process equipment by inhibiting the rate of carburization and metal loss. However, the metal protective layer itself may become compromised due to erosion mechanisms from the processes, processes that are aggravated by high temperatures at localized regions where coke growths inhibit efficient heat transfer.

Even with a metal protective layer protecting the internal surfaces of the process equipment, the internal surfaces need to be periodically evaluated to assess the condition and service life of the process equipment. An example of such evaluation includes intelligent pigging using smart ultrasonic testing (UT gauging) and/or internal video inspection. However, the internal surfaces of the process equipment need to be decoked prior to this evaluation, since problem areas may be hidden by coke deposits, and evaluation without decoking results in incomplete data when using standard external UT gauging and results in semi-qualitative data when using internal video inspection.

Industrial decoking methods include steam decoking and hydraulic pia scraping, both of which damage the metal protective layer protecting the process equipment's internal surfaces. As an alternative, hydroblasting has been used to decoke the internal surfaces of process equipment having metal protective layers. However, hydroblasting is very time-consuming and is uneconomical in many cases due to required downtime of the process equipment.

SUMMARY

Disclosed herein is a method for cleaning a coke deposit from an internal surface of a process equipment, comprising removing at least a portion of the coke deposit from the internal surface using a flexible pig comprising a plurality of bristles, without damaging a metal protective layer of the internal surface of the process equipment.

Also disclosed herein is a flexible pig for cleaning a coke deposit from an internal surface of a process equipment without damaging a metal protective layer of the internal surface, comprising a flexible body formed of a polymeric material, and a plurality of bristles partially encapsulated by the polymeric material of the flexible body.

Further disclosed herein is a system comprising a process equipment having a coke deposit formed on an internal surface comprising a metal protective layer, a flexible pig placed in the process equipment, wherein the flexible pig comprises a flexible body formed of a polymeric material and a plurality of bristles partially encapsulated by the polymeric material, wherein the plurality of bristles contact the internal surface of the process equipment, and a fluid source which provides a fluid force of less than about 60 psig to an end of the flexible pig causing at least one of the plurality of bristles of the flexible pig to contact the coke deposit without damaging the metal protective layer of the internal surface of the process equipment.

Further disclosed herein is a method for cleaning a coke deposit from an internal surface of a process equipment, comprising aromatizing hydrocarbons in an aromatization reactor system to produce an aromatization product, wherein the aromatization reactor system comprises a furnace having a plurality of tubes disposed therein, wherein the internal surface of each of the plurality of tubes has a metal protective layer comprising stannide disposed thereon, and wherein coke deposits are formed on the metal protective layer of the internal surface of one or more of the plurality of furnace tubes, halting the aromatizing and servicing the aromatization reactor system by removing at least a portion of the coke deposit from the internal surface using a flexible pig comprising a plurality of bristles, without damaging the metal protective layer of the internal surface of the furnace tubes, optionally inspecting one or more of the plurality of furnace tubes via video inspection or ultrasonic gauging, and resuming aromatization of hydrocarbons in the aromatization reactor system.

DETAILED DESCRIPTION OF THE ASPECTS

Figure 1:
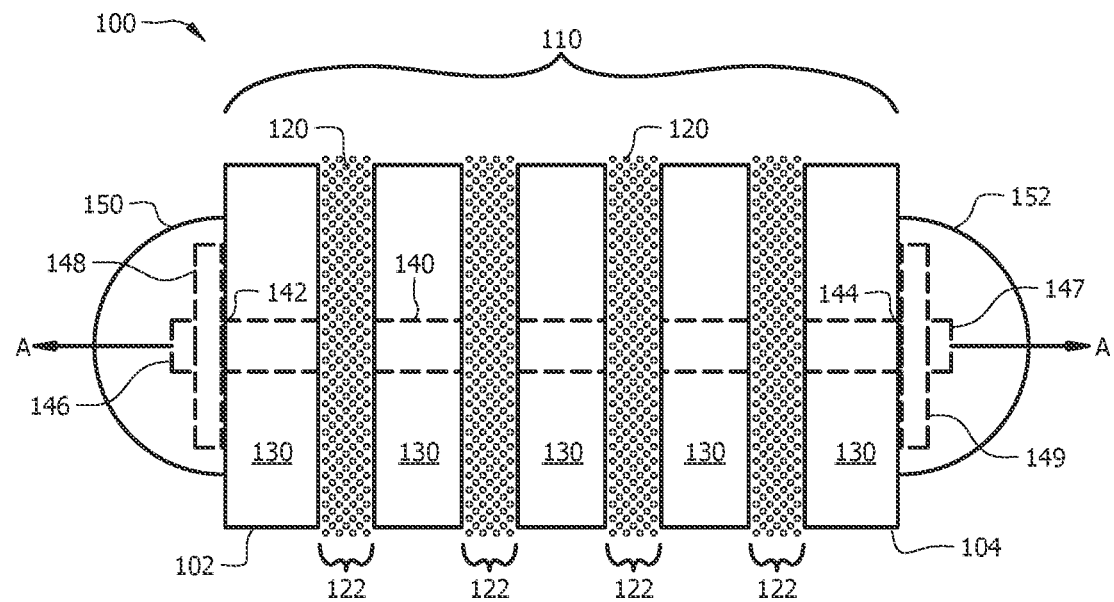
FIG. 1 is a top view of a first aspect of a flexible pig of this disclosure.

Disclosed herein are aspects of one or more flexible pigs used in cleaning one or more coke deposits (for example coke blooms) from the internal surface(s) of process equipment, and methods utilizing same.

Reference to "process equipment" herein refers to any hydrocarbon processing equipment exposed to reactions and/or conditions which form coke deposits on an internal surface which is exposed to said reactions and/or conditions. For simplicity and clarity, a furnace tube used in a catalytic reforming process which has a stannide layer as a protective layer is discussed herein as an aspects of the disclosed process equipment.

Reference to "internal surface" herein refers to the interior surface(s) of the process equipment which is made of a metal (for example carbon steel, mild steel, alloy steel, stainless steel, austenitic stainless steel, or combinations thereof), and to the interior surface(s) of a process equipment which has a protective metal layer thereon, such as a stannide layer protecting the internal surface of the process equipment, for example, a furnace tube as mentioned above.

Reference to a "transition zone" herein refers to a part of the process equipment which is not linear. For example, in context of a pig which travels inside a furnace tube for the purposes disclosed herein, the transition zone can be a 90° tubing elbow which connects two linear portions of tubing, i.e., the 90° tubing elbow is the non-linear portion of tubing which transitions a pig's travel between the two linear portions of tubing.

Reference to "path length" herein refers to the distance a flexible pig of this disclosure travels to pass through the transition zone, as measured along a longitudinal axis of the process equipment.

Reference to "fluid" herein refers to a medium known to those with skill in the art with the aid of this disclosure and, in aspects of this disclosure, may include a hydrocarbon or an aqueous solution and may contain additives including surfactants, rheology modifiers, emulsifiers, anti-foaming agents, ammonia, or combinations thereof. The fluid propels the flexible pig, suspends the materials removed from the processing equipment, removes the materials from the process equipment, or combinations thereof.

Reference to "fluid source" herein refers to equipment known to those with skill in the art with the aid of this disclosure and, in aspects of this disclosure s, may include tanks, pumps, piping, hoses, valves, headers, and control systems used to create a force on the fluid.

Reference to "coke deposit(s)" herein refers to a collection of at least one or more of catalytic coke and thermal coke that is deposited on the internal surfaces of hydrocarbon processing equipment. In some instances, the continued collection of coke leads to a deposit of coke (for example, a coke bloom) that erupts from the internal surface of the process equipment. While not wanting to be constrained to any one theory, when coke dislodges from the internal surface, substrate erosion of the base metal of the process equipment may occur.

Reference to "polymeric material" herein refers to a material made of one or more polymers such as polyethylene, cross-linked polyethylene, polypropylene, polystyrene, polyurethane, rubber, neoprene, copolymers thereof, or combinations thereof.

Reference to "bristle" herein refers to a cylindrically shaped rod which has a length greater than a diameter thereof. A bristle can be rigid, in that, the bristle remains mostly linear against any forces applied against the bristle. Alternatively, a bristle can be bendable in that the bristle can bend against the interior surface of the process equipment when a pig in which the bristle is contained in placed in the process equipment and an end of the bristle is forced against the internal surface.

Reference to "bristle section" herein refers to a collection of bristles (rigid, bendable, or both rigid and bendable).

Reference to "completely encapsulated" herein refers to being completely covered and surrounded.

Reference to "partially encapsulated" herein refers to less than complete encapsulation. For example, a bristle which is "partially encapsulated" by polymeric material means that a portion of the bristle is completely covered and surrounded by the polymeric material, while the remainder of the bristle is not covered and surrounded by the polymeric material.

The process equipment which is cleaned by the aspects of the disclosure generally has one or more internal surfaces in contact with a chemical reaction which deposits coke on at least one of the internal surfaces. The one or more flexible pigs disclosed herein are particularly useful for internal surfaces which have a metal protective layer. Various metal protective layers and methods of applying metal-containing coatings, claddings or other applied metal layers and curing them to form the metal protective layer are disclosed in U.S. Pat. Nos. 6,548,030, 5,406,014, 5,674,376, 5,676,821, 6,419,986, 6,551,660, 5,413,700, 5,593,571, 5,807,842, 5,849,969, and 8,119,203, each of which is incorporated by reference herein in its entirety. Examples of suitable metals or metal-containing compounds which may be used in a metal protective layer include, without limitation, compounds of tin such as stannides, antimony such as antimonides, bismuth such as bismuthides, silicon, lead, mercury, arsenic, germanium, indium, tellurium, selenium, thallium, copper, chromium, aluminum, intermetallic alloys, or combinations thereof. It is contemplated that the metal protective layers which may be cleaned according to aspects of this disclosure may or may not be present for the purpose of inhibiting the deposition of coke on the internal surface(s) of the process equipment along with prevention of metal carburization and metal dusting of the underlying metal. For example, various metal compounds useful as a metal protective layer may be selected and classified according to their resistance to carburization, halide stress corrosion cracking, metal dusting, coking, other degradation mechanisms, or combination thereof. In aspects of this disclosure, the metal protective layer may have a thickness of from about 1 mil (25 µm) to about 100 mils (2.5 mm).

In general, the one or more flexible pigs disclosed herein have at least a portion thereof which is cylindrical in shape such that a plurality of bristles of the flexible pigs contact and clean internal surfaces of process equipment as the flexible pig passes through the process equipment (for example, a furnace tube in a catalytic reforming process). The flexible pigs include a flexible body formed of a polymeric material and a plurality of bristles which are partially encapsulated by the polymeric material of the flexible body. The outer diameters of the flexible body of the flexible pigs are generally smaller than the inner diameter of the process equipment being decoked. For example, the inner diameter of a furnace tube may be nominal pipe size (NPS) of about 3, 3.5, or 4 inches (diameter nominal (DN) of about 80 millimeters, 90 millimeters, or 100 millimeters), and the outer diameter of the flexible body of a flexible pig may be from about 10 millimeters to about 20 millimeters (about 0.39 inches to about 0.78 inches) less than the respective process equipment inner diameter. The bristles generally extend perpendicular to a longitudinal axis of a flexible pig such that the diameter of a bristle section is from about 1 millimeters to about 10 millimeters (about 0.0.04 inches to about 0.39 inches), from about 3 millimeters to about 7 millimeters (about 0.12 inches to about 0.28 inches) greater than the inner diameter of the process equipment being decoked (for example the furnace tube described above). The bristle section is a collection of the bristles partially encapsulated by the polymeric material of the flexible body (bristle sections are described in more detail below). The dimensions of the flexible body and bristles relative to the process equipment are discussed in more detail herein.

The flexible body in combination with the plurality of bristles allows the disclosed flexible pigs to flex and pass through pipe, L-shaped tube elbows (90° angles), U-shaped turns (180° angles), and other non-linear or angled portions of the process equipment in order to remove coke deposits from the internal surface of the process equipment without getting stuck; without gouging the internal surfaces of the elbows; and without damaging the metal protective layer of the process equipment.

In aspects of this disclosure, the overall lengths of the flexible pigs are greater than the path length of a transition zone of the process equipment. The process equipment may include a transition zone, which is referred to herein as a zone of the process equipment in which the path for a flexible pig is not linear (for example a 90° elbow). The path length is the distance the flexible pig travels to pass through the transition zone, as measured along a longitudinal axis of the process equipment. For example, for a furnace tube having a 90° elbow which includes a path length of 2 feet (0.61 m), as measured along the longitudinal axis of the elbow of the furnace tube, the overall length of the flexible pig is at least 2 feet (0.61 m).

Referring to FIG. 1, a first aspect of a flexible pig 100 is shown. The flexible pig 100 has a flexible body 110 made from a polymeric material and bristles 120 partially encapsulated by the flexible body 110. The flexible body 110 may include at least one foam spacer, and in FIG. 1, the flexible body 110 includes five cylindrically-shaped foam spacers 130. The bristles 120 are arranged in one or more bristle sections 122, and in FIG. 1, the flexible pig 100 includes four cylindrically-shaped bristle sections 122. A flexible cable 140 (shown with dashed lines) extends along a longitudinal axis A of the flexible pig 100 and through the cylindrically-shaped foam spacers 130. The flexible cable 140 also extends through the cylindrically-shaped bristle sections 122. In FIG. 1, the flexible cable 140 has an end 142 anchored to an end 102 of the flexible pig 100 and an opposite end 144 anchored to an opposite end 104 of the flexible pig 100.

The five cylindrically-shaped foam spacers 130 are separated from one another by the four cylindrically-shaped bristle sections 122 containing the bristles 120. Any number of foam spacers 130 and bristle sections 122 are contemplated, and the number of foam spacers 130 and bristle sections 122 shown in FIG. 1 is intended only as exemplary. In FIG. 1, the foam spacers 130 are made of a closed-cell foam. The closed-cell foam may be made from a polymeric material such as polyethylene, cross-linked polyethylene, polypropylene, polystyrene, polyurethane, rubber, neoprene, copolymers thereof, or combinations thereof. The closed-cell foam of the foam spacers 130 of the flexible body 110 allows the flexible pig 100 to flex and bend as the flexible pig 100 passes through curves and elbows of the process equipment. The closed-cell foam also provides a barrier of resistance to a fluid force allowing for propulsion of the flexible pig 100 through the processing equipment via a fluid supplied by a fluid source. That is, at least one of the ends (at least one or more of end 102 and opposite end 104) of the flexible pig 100 includes a foam spacer 130 so that the flexible pig 100 may be pushed through the process equipment by the fluid while cleaning the internal surfaces. In an aspects of this disclosure, both end 102 and opposite end 104 (as shown in FIG. 1) include foam spacers 130 so that the flexible pig 100 may pass back and forth over a desired portion of the internal surface of the process equipment via alternating the application of the fluid force between the end 102 and the opposite end 104 of the flexible pig 100.

The outer diameter of the foam spacers 130 is less than the inner diameter of the process equipment being cleaned. For example, for a furnace tube which has an inner diameter of nominal pipe size (NPS) of about 3, 3.5, or 4 inches (diameter nominal (DN) of about 80 millimeters, 90 millimeters, or 100 millimeters), the outer diameter of the foam spacers 130 of the flexible pig 100 may be from about 10 millimeters to about 20 millimeters (about 0.39 inches to about 0.78 inches) less than the respective furnace tube inner diameter. In aspects of this disclosure, the length of the foam spacers 130 (as measured along the longitudinal axis A of the flexible pig 100) may be from about 0.5 inches to about 5 inches (about 12.7 millimeters to about 127 millimeters). In FIG. 1, the length of the foam spacers 130 is greater than the length of the bristle sections 122.

In aspects of this disclosure, a ratio of length to diameter (L/D) of the flexible pig 100 may be from about 2:1 to about 6:1; alternatively from about 3:1 to about 5:1; alternatively abut 4:1, to ensure smooth hydraulic transition through the transition zones of the process equipment.

Each of the foam spacers 130 has the same length in FIG. 1, as measured along axis A; however, it is contemplated that at least one of the foam spacers 130 may have a length different from a length of at least one other foam spacer 130. Moreover, each of the foam spacers 130 has the same closed-cell foam material in FIG. 1; however, it is contemplated that at least one of the foam spacers 130 is made of a closed-cell foam material which is different than the closed-cell foam of at least one other of the foam spacers 130.

The bristles 120 are included in the four bristle sections 122. The bristles 120 of the bristle sections 122 in FIG. 1 are arranged in the configuration of a rotary bristle wheel or brush (for example, the bristles may extend radially outwardly perpendicular to the longitudinal axis of a center donut-shaped piece). Each of the bristles 120 has a diameter of about 5, 4, 3, 2, 1, 0.5, or less millimeters (about 0.20, 0.16, 0.125, 0.08, 0.05, 0.016 or less inches). The bristles 120 may be made of a metal, polymer, or natural material. Examples of metal materials for the bristles 120 include stainless steel higher than 304 stainless steel, such as 316 stainless steel and 321 stainless steel, and brass. An example of a polymer material for the bristles 120 includes nylon (including nylon-6, nylon-6,6 and nylon-6,12), polyester, PEEK, polyethylene, and polypropylene. Examples of natural materials for bristles 120 include Tampico, Palmyra, and Palmetto. It is contemplated that a portion of the bristles 120 is metal and another portion of the bristles 120 is nylon. For example, one of the bristle sections 122 may have nylon bristles while the other bristle sections 122 may have metal bristles. It is also contemplated that a single bristle section 122 may have one or more of metal bristles, polymer bristles, natural bristles, or any combination thereof. In an aspect of this disclosure, the bristles 120 include no iron.

The bristle sections 122 are separated by the foam spacers 130 to provide a gap between the sections 122 which may compress and flex, thus providing for bending and flexing of the flexible body 110 of the pig 100 to accommodate for changes in the contour of the process equipment as the flexible pig 100 moves through the process equipment. The ability of the foam spacers 130 to compress and flex also compels the bristles 120 to remain in contact with the internal surface of the process equipment.

In FIG. 1, each of the bristle sections 122 is cylindrically-shaped, and each of the bristles 120 extends radially outwardly from and perpendicular to the longitudinal axis A of the respective bristle section 122 in which the bristle is located. In aspects of this disclosure, the length of the bristle sections 122 (as measured along the longitudinal axis A of the flexible pig 100) may be from about 0.5 inches to about 5 inches (about 12.7 millimeters to about 127 millimeters). In FIG. 1, the length of the bristle sections 122 is less than the length of the foam spacers 130. Each of the bristle sections 122 has the same length, as measured along axis A; however, it is contemplated that the bristles 120 may be arranged in sections in which at least one section has a different length relative to at least another section. Moreover, each of the bristle sections 122 has the same bristle configuration (for example rotary bristle wheel or brush); however, it is contemplated that the bristles 120 may be arranged in various configurations among the bristle sections 122 of the flexible pig 100 (for example, rotary bristle wheel or brush, spiral configuration, or combinations thereof).

As can be seen in FIG. 1, at least one end of each cylindrically-shaped foam spacer 130 is in contact with an end of at least one cylindrically-shaped bristle section 122. The foam spacers 130 which are on the end 102 and opposite end 104 of the flexible pig 100 only have one end which contacts a bristle section 122. The foam spacers 130 which are not on the ends 102 and 104 of the flexible pig 100 contact bristle sections 122 on both ends of the foam spacers 130. Each of the bristle sections 122 contacts a foam spacer 130 on both ends of the respective bristle section 122.

In aspects of this disclosure, a metal protective layer is present on at least a portion of at least one of the bristles 120. The metal protective layer of the bristle(s) 120 may be the same as or different than the metal protective layer protecting the internal surface of the process equipment.

Generally, the metal protective layer (MPL) is formed by applying one or more metals or metal-containing compounds to a bristle to form an applied metal layer (AML), which may be subsequently cured to form the MPL. Techniques for applying the AML and curing to form the MPL are described in detail below. Examples of suitable metals or metal-containing compounds which may be used in a metal protective layer for the bristles 120 include, without limitation, compounds of tin such as stannides, antimony such as antimonides, bismuth such as bismuthides, silicon, lead, mercury, arsenic, germanium, indium, tellurium, selenium, thallium, copper, chromium, aluminum, intermetallic alloys, or combinations thereof. Including a metal protective layer on at least one of the bristles 120 allows for the bristles 120 to transfer a small amount of metal protective layer to the internal surface(s) of the process equipment in addition to removing coke deposits without damaging the metal protective layer of the process equipment internal surface(s).

In aspects of this disclosure, a hardness of the bristle(s) 120 having a metal protective layer is equal to or less than a hardness of a metal protective layer of the internal surface of the process equipment.

As may be seen in FIG. 1, the flexible cable 140 of the flexible pig 100 extends along the longitudinal axis A and through the bristle sections 122 and the foam spacers 130. The flexible cable 140 may be made of a material comprising polymer, steel, or a combination polymer and steel, and optionally in the configured as a rope, fibers, links, or combinations thereof, which form the cable.

The anchoring of the end 142 and opposite end 144 of the flexible cable may be via any technique known in the art with the aid of this disclosure. For example, the end 142 of the flexible cable 140 may be anchored via a washer 146 and nut or bolt 148 (both shown in dashed lines) which are placed on a threaded portion of the end 142 of the flexible cable 140. The washer 146, the nut or bolt 148, or both may be attached (for example, welded for a metal flexible cable or bonded for a polymeric flexible cable) to the end 142 of the flexible cable 140 so as to hold the flexible body 110 and bristles 120 together as a unit during cleaning of coke deposits. The opposite end 144 of the flexible cable 140 may be anchored via a washer 147 and nut or bolt 149 (both shown in dashed lines) which are placed on a threaded portion of the opposite end 144 of the flexible cable 140. The washer 147, the nut or bolt 149, or both may be attached (for example, welded for a metal flexible cable or bonded for a polymeric flexible cable) to the opposite end 144 of the flexible cable 140 so that the flexible body 110 and bristles 120 do not separate during cleaning of coke deposits.

In aspects of this disclosure, adhesives can also be used between bristle sections 122, between foam spacers 130, between adjacent bristle sections 122 and foam spacers 130, or a combination thereof. Use of an adhesive in this manner may prevent rotation of the bristle sections 122 and foam spacers 130 in different direction, and avoid excessive wear to the bristles 120 associated with excessive rotation within the process equipment.

In aspects of this disclosure, the end 102 of the flexible pig 100 may be coated with a durable polymer 150 or covered with a polymeric end cap so that the metal surfaces of the secured end 142 of the flexible cable 140 (for example, washer 146 and nut or bolt 148 in FIG. 1) do not damage the metal protective layer protecting the internal surface of the process equipment being cleaned. In aspects of this disclosure, the opposite end 104 of the flexible pig 100 may be coated with a durable polymer 152 and/or covered with a polymeric end cap so that the metal surfaces of the secured end 144 of the flexible cable 140 (for example, washer 147 and nut or bolt 149 in FIG. 1) do not damage the metal protective layer protecting the internal surface of the process equipment being cleaned. If needed, the durable polymer or polymeric end cap may be attached to the end 102 and opposite end 104 of the flexible pig 100 via adhesive, bolts, screws, magnets, or combinations thereof. In aspects of this disclosure, the durable polymer coating or polymeric end cap may be shaped such that the outer face is concave (for example, shaped like an apron cup or concave disc) for the purpose of capturing more force of the fluid force against the flexible pig 100.

Figure 2:
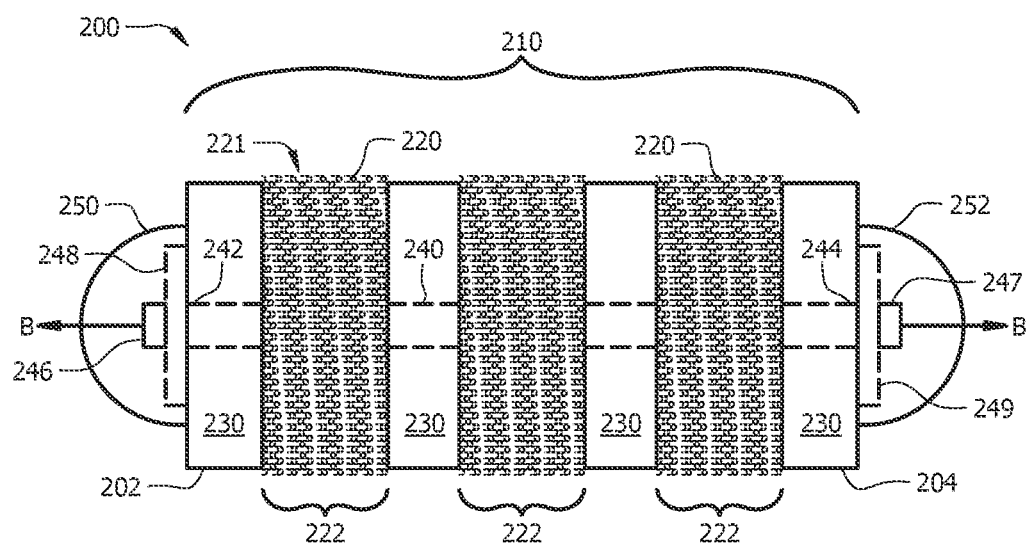
FIG. 2 is a top view of a second aspect of a flexible pig of this disclosure.

Referring to FIG. 2, a second aspect of a flexible pig 200 is shown. The flexible pig 200 has a flexible body 210 formed of a polymeric material and bristles 220 partially encapsulated by the polymeric material of the flexible body 210. The flexible body 210 may include at least one foam spacer, and in FIG. 2, the flexible body 210 includes four cylindrically-shaped foam spacers 230. The bristles 220 are arranged in one or more bristle sections 222, and in FIG. 2, the flexible pig 200 includes three cylindrically-shaped bristle sections 222. A flexible cable 240 (shown with dashed lines) extends along a longitudinal axis B of the flexible pig 200 and through the cylindrically-shaped foam spacers 230. The flexible cable 240 also extends through the cylindrically-shaped bristle sections 222. In FIG. 2, the flexible cable 240 has an end 242 anchored to an end 202 of the flexible pig 200 and an opposite end 244 anchored to an opposite end 204 of the flexible pig 200.

The four cylindrically-shaped foam spacers 230 are separated from one another by three cylindrically-shaped bristle sections 222 containing the bristles 220. Any number of foam spacers 230 and bristle sections 222 are contemplated, and the number of foam spacers 230 and bristle sections 222 shown in FIG. 2 is intended only as exemplary. Like the flexible pig 100 of FIG. 1, the foam spacers 230 of FIG. 2 are made of a closed-cell foam which is made from a polymeric material such as polyethylene, cross-linked polyethylene, polypropylene, polystyrene, polyurethane, rubber, neoprene, copolymers thereof, or combinations thereof. The closed-cell foam of the foam spacers 230 of the flexible body 210 allows the flexible pig 200 to flex and bend as the flexible pig 200 passes through curves and elbows of the process equipment. The closed-cell foam also provides a barrier of resistance to a fluid allowing for propulsion of the flexible pig 200 through the processing equipment via the fluid. That is, at least one of the ends (at least one or more of end 202 and opposite end 204) of the flexible pig 200 includes a foam spacer 230 so that the flexible pig 200 may be pushed through the process equipment by the fluid for cleaning the internal surfaces. In aspects of this disclosure, both end 202 and opposite end 204 (as shown in FIG. 2) include foam spacers 230 so that the flexible pig 200 may pass back and forth over a desired portion of the internal surface of the process equipment via alternating the application of the fluid force between the end 202 and the opposite end 204 of the flexible pig 200.

The outer diameter of the foam spacers 230 is less than the inner diameter of the process equipment being cleaned. For example, for a furnace tube which has an inner diameter of nominal pipe size (NPS) of about 3, 3.5, or 4 inches (diameter nominal (DN) of about 80 millimeters, 90 millimeters, or 100 millimeters), the outer diameter of the foam spacers 230 of the flexible pig 200 may be from about 10 millimeters to about 20 millimeters (about 0.39 inches to about 0.78 inches) less than the respective furnace tube inner diameter. In aspects of this disclosure, the length of the foam spacers 230 (as measured along the longitudinal axis B of the flexible pig 200) may be from about 0.5 inches to about 5 inches (about 12.7 millimeters to about 127 millimeters). In FIG. 2, the length of the foam spacers 230 is less than the length of the bristle sections 222.

In aspects of this disclosure, a ratio of length to diameter (L/D) of the flexible pig 200 may be from about 2:1 to about 6:1; alternatively from about 3:1 to about 5:1; alternatively abut 4:1, to ensure smooth hydraulic transition through the transition zones of the process equipment.

Each of the foam spacers 230 has the same length in FIG. 2, as measured along axis B; however, it is contemplated that at least one of the foam spacers 230 may have a length different from a length of at least one other foam spacer 230. Moreover, each of the foam spacers 230 has the same closed-cell foam material in FIG. 2; however, it is contemplated that at least one of the foam spacers 230 is made of a closed-cell foam material which is different than the closed-cell foam material of at least one other of the foam spacers 230.

The bristles 220 are included in the three bristle sections 222. The bristles 220 of the bristle sections 222 in FIG. 2 are arranged in the configuration of a spiral bristle coil 221 or brush (for example, the bristles may extend radially outwardly perpendicular to the longitudinal axis of a center donut-shaped piece). Each of the bristles 220 has a diameter of about 5, 4, 3, 2, 1, 0.5, or less millimeters (about 0.20, 0.16, 0.125, 0.08, 0.05, 0.016 or less inches). The bristles 220 may be made of a metal, polymer, or natural material. Examples of metal materials for the bristles 220 include stainless steel higher than 304 stainless steel, such as 316 stainless steel and 321 stainless steel, and brass. An example of a polymer material for the bristles 220 includes nylon (including nylon-6, nylon-6,6 and nylon-6,12), polyester, PEEK, polyethylene, and polypropylene. Examples of natural materials for the bristles 120 include Tampico, Palmyra, and Palmetto. It is contemplated that a portion of the bristles 220 is metal and another portion of the bristles 220 is nylon. For example, one of the bristle sections 222 may have nylon bristles while the other bristle sections 222 may have metal bristles. It is also contemplated that a single bristle section 222 may have one or more of metal bristles, polymer bristles, natural bristles, or any combination thereof. In aspects of this disclosure, the bristles 220 include no iron.

The bristle sections 222 are separated by the foam spacers 230 so as to provide a gap between the sections 222, which may compress and flex, thus bending and flexing the flexible body 210 of the pig 200 to accommodate for changes in the contour of the process equipment as the flexible pig 200 moves through the process equipment. The ability of the foam spacers 230 to compress and flex also compels the bristles 220 to remain in contact with the internal surface of the process equipment.

In FIG. 2, each of the bristle sections 222 is cylindrically-shaped, and each of the bristles 220 extends radially outwardly from and perpendicular to the longitudinal axis B of the respective bristle section 222 in which the bristle is located. In aspects of this disclosure, the length of the bristle sections 222 (as measured along the longitudinal axis B of the flexible pig 200) may be from about 0.5 inches to about 5 inches (about 12.7 millimeters to about 127 millimeters). In FIG. 2, the length of the bristle sections 222 is greater than the length of the foam spacers 230. Each of the bristle sections 222 has the same length, as measured along axis B; however, it is contemplated that the bristles 220 may be arranged in sections in which at least one section has a different length relative to at least another section. Moreover, each of the bristle sections 222 has the same bristle configuration (for example, spiral coil or spiral brush); however, it is contemplated that the bristles 220 may be arranged in various configurations among the bristle sections 222 of the flexible pig 200 (for example, rotary wheel or brush, spiral coil or brush, or combinations thereof).

As may be seen in FIG. 2, at least one end of each cylindrically-shaped foam spacer 230 is in contact with an end of at least one cylindrically-shaped bristle section 222. The foam spacers 230 which are on the end 202 and opposite end 204 of the flexible pig 200 only have one end which contacts a bristle section 222. The foam spacers 230 which are not on the ends 202 and 204 of the flexible pig 200 contact bristle sections 222 on both ends of the foam spacers 230. Each of the bristle sections 222 contacts a foam spacer 230 on both ends of the respective bristle section 222.

In aspects of this disclosure, a metal protective layer is present on at least a portion of at least one of the bristles 220. The metal protective layer of the bristle(s) 220 may be the same as or different than the metal protective layer of the internal surface of the process equipment. Generally, the metal protective layer (MPL) is formed by applying one or more metals or metal-containing compounds to a bristle to form an applied metal layer (AML), which may be subsequently cured to form the MPL. Techniques for applying the AML and curing to form the MPL are described in detail below. The MPL of bristles 220 for flexible pig 200 includes the same characteristics as described for the MPL of bristles 120 of flexible pig 100. Including a MPL on the bristles 220 allows for the bristles 220 to apply small amount of protective metal to the internal surface(s) of the process equipment in addition to removing coke deposits (for example, coke blooms) without damaging the metal protective layer of the process equipment internal surface(s).

As may be seen in FIG. 2, the flexible cable 240 of the flexible pig 200 extends along the longitudinal axis B through the bristle sections 222 and the foam spacers 230. The flexible cable 240 may be made of a material comprising polymer, steel, or a combination polymer and steel, and optionally in the configured as a rope, fibers, links, or combinations thereof, which form the cable.

The anchoring of the end 242 and opposite end 244 may be via any technique known in the art with the aid of this disclosure. For example, the end 242 of the flexible cable 240 may be anchored via a washer 248 and nut or bolt 246 (both shown in dashed lines) which are placed on a threaded portion of the end 242 of the flexible cable 240. The washer 248, the nut or bolt 246, or both may be attached (for example, welded for a metal flexible cable or bonded for a polymeric flexible cable) to the end 242 of the flexible cable 240 so as to hold the flexible body 210 and bristles 220 together as a unit during cleaning of coke deposits. The opposite end 244 of the flexible cable 240 may be anchored via a washer 247 and nut or bolt 249 (both shown in dashed lines) which are placed on a threaded portion of the opposite end 244 of the flexible cable 240. The washer 247, the nut 249, or both may be attached (for example, welded for a metal flexible cable or bonded for a polymeric flexible cable) to the opposite end 244 of the flexible cable 240 so that the flexible body 210 and bristles 220 do not separate during cleaning of coke deposits.

In aspects of this disclosure, adhesives can also be used between bristle sections 222, between foam spacers 230, between adjacent bristle sections 222 and foam spacers 230, or a combination thereof. Use of an adhesive in this manner may prevent rotation of the bristle sections 222 and foam spacers 230 in different direction, and avoid excessive wear to the bristles 220 associated with excessive rotation within the process equipment.

In aspects of this disclosure, the end 202 of the flexible pig 200 may be coated with a durable polymer 250 or covered with a polymeric end cap so that the metal surfaces of the secured end 242 of the flexible cable 240 (for example, washer 248 and nut or bolt 246 in FIG. 2) do not damage the metal protective layer of the internal surface of the process equipment being cleaned. In aspects of this disclosure, the opposite end 204 of the flexible pig 200 may be coated with a durable polymer 252 and/or covered with a polymeric end cap so that the metal surfaces of the secured end 244 of the flexible cable 240 (for example, washer 247 and nut or bolt 249 in FIG. 2) do not damage the metal protective layer of the internal surface of the process equipment being cleaned. If needed, the durable polymer or polymeric end cap may be attached to the end 202 and opposite end 204 of the flexible pig 200 via adhesive, bolts, screws, magnets, or combinations thereof. In aspects of this disclosure, the durable polymer coating or polymeric end cap may be shaped such that the outer face is concave (for example, shaped like an apron cup or concave disc) for the purpose of capturing more force of the fluid against the flexible pig 200.

In addition to the flexible pigs 100 and 200 shown in FIGS. 1 and 2, respectively, aspects of the disclosure contemplate the bristles 120 of flexible pig 100 and bristles 220 of flexible pig 200 are in a combination of spiral, rotary brush, and rotary wheel configurations.

Figure 3:
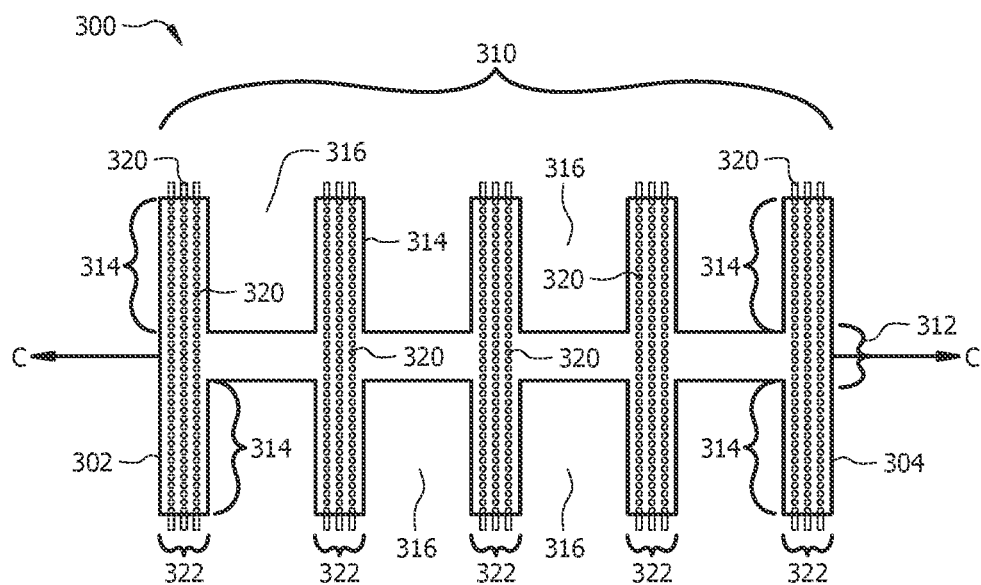
FIG. 3 is a top view of a third aspect of a flexible pig of this disclosure.

Referring to FIG. 3, a third aspects of a flexible pig 300 is shown. The flexible pig 300 has a flexible body 310 made of a polymeric material and bristles 320 partially encapsulated by the polymeric material. Particularly, at least a portion of each of the plurality of the bristles 320 are partially encapsulated by the polymeric material of the flexible body 310. The bristles 320 are arranged in one or more bristle sections 322, and in FIG. 3, the flexible pig 300 includes five bristle sections 322.

The flexible body 310 in FIG. 3 is a molded polymeric body formed of a polymeric material such as polyethylene, cross-linked polyethylene, polypropylene, polystyrene, neoprene, polyurethane, rubber, copolymers thereof, or combinations thereof. As may be seen, at least a portion of each of the bristles 320 partially encapsulated by the polymeric material of the molded polymeric body. The flexible body 310 includes an axial portion 312 and radial portions 314 formed in spaced intervals along the axial portion 312. Generally, the radial portions 314 extend from the axial portion 312 in a direction perpendicular to a longitudinal axis C of the flexible pig 300. The shape of the radial portions 314 may be a disc shape, with the axial portion 312 extending through the center of the radial portions 314. In FIG. 3, the flexible body 310 is formed with five radial portions 314. However, it is contemplated that any number of radial portions may be formed in aspects of the disclosure having a molded polymeric body. The voids 316 which are present as a result of forming the radial portions 314 in spaced intervals provide space for the radial portions 314 to bend and/or flex to angles relative to the axial portion 312 other than perpendicular, when passing the flexible pig 300 through process equipment which includes bends and curves, such as a pipe or tube elbow.

At least one of the radial portions 314 provides a barrier of resistance to a fluid allowing for propulsion of the flexible pig 300 through the processing equipment by the fluid force. That is, at least one of the ends (at least one or more of end 302 and opposite end 304) of the flexible pig 300 includes a radial portion 314 so that the flexible pig 300 may be pushed through the process equipment by the fluid force for cleaning the internal surfaces. In aspects of the disclosure, both end 302 and opposite end 304 include radial portions 314 (as shown in FIG. 3) so that the flexible pig 300 may be pass back and forth over a desired portion of the internal surface of the process equipment via alternating the application of the fluid force between the end 302 and the opposite end 304 of the flexible pig 300.

The outer diameter of the flexible body 310 is less than the inner diameter of the process equipment being cleaned. For example, for a furnace tube which has an inner diameter of nominal pipe size (NPS) of about 3, 3.5, or 4 inches (diameter nominal (DN) of about 80 millimeters, 90 millimeters, or 100 millimeters), the outer diameter of the flexible body 310 may be from about 10 millimeters to about 20 millimeters (about 0.39 inches to about 0.78 inches) less than the respective furnace tube inner diameter. In aspects of the disclosure, the length of each of the radial portions 314 (as measured along the longitudinal axis C of the flexible pig 300) may be from about 0.5 inches to about 5 inches (about 12.7 millimeters to about 127 millimeters). In FIG. 3, the length of the radial portions 314 is less than the length of the voids 316; however, it is contemplated that the length of at least one of the radial portions 314 may be greater than the length of at least one of the voids 316.

In aspects of the disclosure, a ratio of length to diameter (L/D) of the flexible pig 300 may be from about 2:1 to about 6:1; alternatively from about 3:1 to about 5:1; alternatively abut 4:1, to ensure smooth hydraulic transition through the transition zones of the process equipment.

In aspects of the disclosure, a ratio of the length of the radial portions 314 to the length of the voids 316 (R/V ratio) is a value in a range of about 1:8 to about 8:1.

Each of the radial portions 314 has the same length in FIG. 3, as measured along axis C; however, it is contemplated that at least one of the radial portions 314 may have a length different from at least one other radial portion 314. Moreover, each of the radial portions 314 is made of the same material in FIG. 3; however, it is contemplated that at least one of the radial portions 314 is made of a first material (for example, one of those disclosed herein for the flexible body 310) which is different than a second material of at least one other of the radial portions 314. It is understood that the length of the voids 316 (as measured along the longitudinal axis C of the flexible pig 300) may vary according to the chosen length and spacing of the radial portions 314.

At least a portion of each of the plurality of the bristles 320 of the flexible pig 300 is partially encapsulated by the polymeric material in the radial portions 314, and in some aspects of the disclosure, at least a portion is partially encapsulated by the polymeric material in both the radial portions 314 and axial portion 312 of the flexible body 310. The bristles 320 partially encapsulated by the polymeric material in the radial portions 314 may be collectively referred to as the bristle sections 322 of the flexible body 310. In FIG. 3, the bristles 320 are included in five bristle sections 322; however, as with the radial portions 314, any number of bristle sections 322 is contemplated.

The bristles 320 of the bristle sections 322 in FIG. 3 are arranged in the configuration of a bristle brush (for example, a portion of the bristles 320 are grouped in each bristle section 322 and each of the bristles 320 extends radially outwardly perpendicular to the longitudinal axis C of the flexible pig 300) such that only one end of each bristle 320 is used for cleaning the process equipment. It is also contemplated that one or more of the bristles 320 may extend through the entire diameter of the flexible pig 300 such that both ends of such bristles extend out of the flexible body 310 for cleaning the process equipment.

Each of the bristles 320 has a diameter of about 5, 4, 3, 2, 1, 0.5, or less millimeters (about 0.20, 0.16, 0.125, 0.08, 0.05, 0.016 or less inches). The bristles 320 may be made of a metal, polymer, or natural materials. Examples of metal materials for the bristles 320 include stainless steel higher than 304 stainless steel, such as 316 stainless steel and 321 stainless steel, and brass. An example of a polymer material for the bristles 320 includes nylon (including nylon-6, nylon-6,6 and nylon-6,12), polyester, PEEK, polyethylene, and polypropylene. Examples of natural materials for the bristles 120 include Tampico, Palmyra, and Palmetto. It is contemplated that a portion of the bristles 320 is metal and another portion of the bristles 320 is nylon. For example, one of the bristle sections 322 may have nylon bristles while the other bristle sections 322 may have metal bristles. It is also contemplated that a single bristle section 322 may have one or more of metal bristles, polymer bristles, natural bristles, or any combination thereof. In aspects of the disclosure, the bristles 320 include no iron.

In FIG. 3, each of the bristle sections 322 takes the shape/form of the radial portions 314, and each of the bristles 320 extends radially outwardly from and perpendicular to the longitudinal axis C of the flexible pig 300. In aspects of the disclosure, the length of the bristle sections 322 (as measured along the longitudinal axis C of the flexible pig 300) may be from about 0.5 inches to about 5 inches (about 12.7 millimeters to about 127 millimeters). In FIG. 3, the length of the bristle sections 322 is less than the length of the voids 316. Each of the bristle sections 322 has the same length, as measured along axis C; however, it is contemplated that the bristles 320 may be arranged in sections in which at least one section has a different length relative to a length of at least another section. Moreover, each of the bristle sections 322 has the same bristle configuration (for example, a brush); however, it is contemplated that the bristles 320 may be arranged in various configurations among the bristle sections 322 of the flexible pig 300 (for example, spiral coil or brush configuration, rotary wheel or brush configuration, or combinations thereof).

In aspects of the disclosure, a metal protective layer is present on at least a portion of at least one of the bristles 320. The metal protective layer of the bristle(s) 320 may be the same as or different than the metal protective layer of the internal surface of the process equipment. Generally, the metal protective layer (MPL) is formed by applying one or more metals or metal-containing compounds to a bristle to form an applied metal layer (AML), which may be subsequently cured to form the MPL. Techniques for applying the AML and curing to form the MPL are described in detail below. The MPL of bristles 320 for flexible pig 300 includes the same characteristics as described for the MPL of bristles 120 of flexible pig 100. Including a MPL on the bristles 320 allows for the bristles 320 to apply small amount of protective metal to the internal surface(s) of the process equipment in addition to removing coke deposits (for example, coke blooms) without damaging the metal protective layer of the process equipment internal surface(s).

As may be seen in FIG. 3, the flexible pig 300 does not include a flexible cable because the flexible body 310 is a single piece of molded polymer. However, it is contemplated that a central linkage may be present in the flexible pig 300. The central linkage may anchor the bristles 320 in the flexible pig 300. The central linkage may be completely encapsulated by the polymeric material of the flexible body 310 and may extend within the axial portion 312 along the longitudinal axis C of the flexible pig 300 from end 302 to opposite end 304 of the flexible pig 300. The central linkage may be a chain, or any other means for anchoring the bristles 320 within the flexible body 310. For example, the central linkage may also be embodied as the flexible cable of FIGS. 1 and 2, except the bristles 320 are anchored/attached to the flexible cable. In other aspects of the disclosure, the flexible cable may be utilized to improve the rigidity of the flexible body 310, with or without anchoring the bristles 320 to the flexible cable.

Because the flexible body 310 of the flexible pig 300 is itself made from a molded polymeric material and does not include a flexible cable, there is no need for encapsulating the ends 302 and 304 of the flexible pig 300 in the polymeric material or to use a polymeric end cap. In aspects of the disclosure of the flexible pig 300 which utilize a flexible cable, end caps may be utilized in the same manner as described herein for flexible pigs 100 and/or 200.

Figure 4:
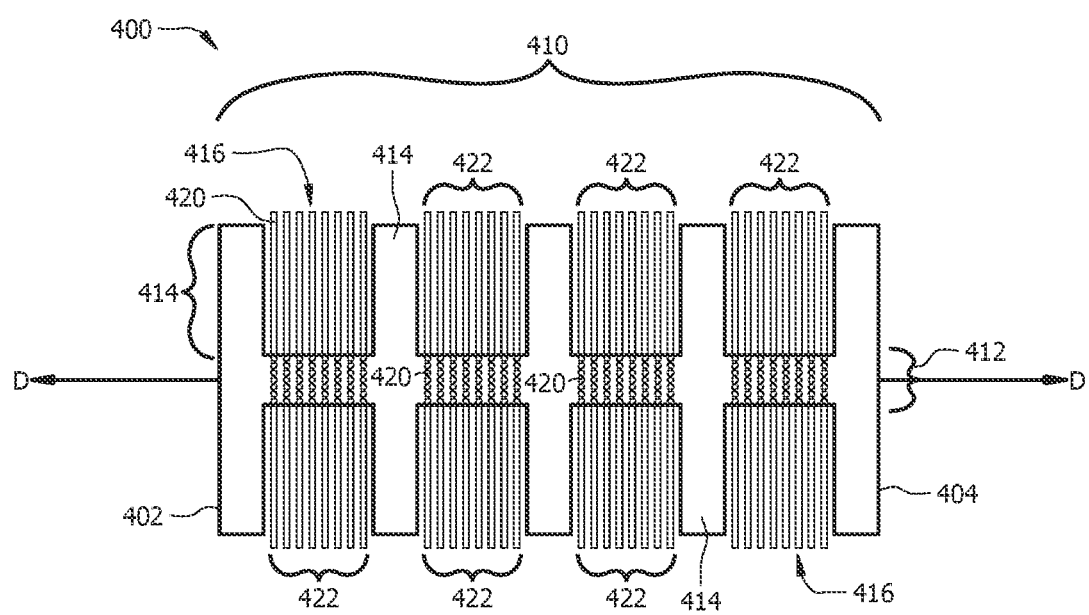
FIG. 4 is a top view of a fourth aspect of a flexible pig of this disclosure.

Referring to FIG. 4, a fourth aspects of a flexible pig 400 is shown. The flexible pig 400 has a flexible body 410 and bristles 420 partially encapsulated by the polymeric material of the flexible body 410. Particularly, at least a portion of the bristles 420 is partially encapsulated by the polymeric material of the flexible body 410. The bristles 420 are arranged in one or more bristle sections 422, and in FIG. 4, the flexible pig 400 includes four bristle sections 422.

Like the flexible body 310 of FIG. 3, the flexible body 410 in FIG. 4 is a molded polymeric body formed of a polymeric material such as polyethylene, cross-linked polyethylene, polypropylene, polystyrene, neoprene, polyurethane, rubber, copolymers thereof, or combinations thereof. As may be seen, at least a portion of each of the bristles 420 is partially encapsulated by the polymeric material of the molded polymeric body. The flexible body 410 includes an axial portion 412 and radial portions 414 formed in spaced intervals along the axial portion 412. Generally, the radial portions 414 extend from the axial portion 412 in a direction perpendicular to a longitudinal axis D of the flexible pig 400. The shape of the radial portions 414 may be a disc shape, with the axial portion 412 extending through the center of the radial portions 414. In FIG. 4, the flexible body 410 is formed with five radial portions 414. However, it is contemplated that any number of radial portions may be formed in aspects of the disclosure having a molded polymeric body. The voids 416 which are present as a result of forming the radial portions 414 in spaced intervals provide space for the radial portions 414 to bend and/or flex to angles relative to the axial portion 412 other than perpendicular, when passing the flexible pig 400 through process equipment which includes bends and curves, such as a pipe or tube elbow.

At least one of the radial portions 414 provides a barrier of resistance to a fluid allowing for propulsion of the flexible pig 400 through the processing equipment via the fluid supplied by the fluid source. That is, at least one of the ends (at least one or more of end 402 and opposite end 404) of the flexible pig 400 includes a radial portion 414 so that the flexible pig 400 may be pushed through the process equipment by the fluid while cleaning the internal surfaces. In aspects of the disclosure, both end 402 and opposite end 404 include radial portions 414 (as shown in FIG. 4) so that the flexible pig 400 may be pass back and forth over a desired portion of the internal surface of the process equipment via alternating the application of the fluid force between the end 402 and the opposite end 404 of the flexible pig 400.

The outer diameter of the flexible body 410 is less than the inner diameter of the process equipment being cleaned. For example, for a furnace tube which has an inner diameter of nominal pipe size (NPS) of about 3, 3.5, or 4 inches (diameter nominal (DN) of about 80 millimeters, 90 millimeters, or 100 millimeters), the outer diameter of the flexible body 410 may be from about 10 millimeters to about 20 millimeters (about 0.39 inches to about 0.78 inches) less than the respective furnace tube inner diameter. In aspects of the disclosure, the length of each of the radial portions 414 (as measured along the longitudinal axis D of the flexible pig 300) may be from about 0.5 inches to about 5 inches (about 12.7 millimeters to about 127 millimeters). In FIG. 4, the length of the radial portions 414 is less than the length of the voids 416; however, it is contemplated that the length of at least one of the radial portions 414 may be greater than the length of at least one of the voids 416.

In aspects of the disclosure, a ratio of length to diameter (L/D) of the flexible pig 400 may be from about 2:1 to about 6:1; alternatively from about 3:1 to about 5:1; alternatively abut 4:1, to ensure smooth hydraulic transition through the transition zones of the process equipment.

Each of the radial portions 414 has the same length in FIG. 4, as measured along axis D; however, it is contemplated that at least one of the radial portions 414 may have a length different from at least one other radial portion 414. Moreover, each of the radial portions 414 is made of the same material in FIG. 4; however, it is contemplated that at least one of the radial portions 414 is made of a first material (for example one of the materials disclosed herein for the flexible body 410) which is different than a second material of at least one other of the radial portions 414. It is understood that the length of the voids 416 may vary according to the chosen length and spacing of the radial portions 414.

The aspects of the disclosure of the flexible pig 400 in FIG. 4 includes the bristles 420 wherein at least a portion of each of the bristles is partially encapsulated by the polymeric material of only the axial portion 412 of the flexible body 410 such that the bristles 420 extend outwardly of the axial portion 412 and into the voids 416 of the flexible body 410. However, it is contemplated that at least a portion of each of the bristles 420 may be partially encapsulated in the polymeric material of sections of the flexible body 310 such that some or all of the bristles 420 extend within only the radial portions 414, both the radial portions 414 and axial portion 412 of the flexible body 410, only the axial portion 412 (as shown in FIG. 4), or combinations thereof. The bristles 420 partially encapsulated in the polymeric material of the axial portion 412 and extending within each void 416 may be collectively referred to as the bristle sections 422 of the flexible body 410. In FIG. 4, the bristles 420 are included in four bristle sections 422; however, as with the radial portions 414, any number of bristle sections 422 is contemplated.

The bristles 420 of the bristle sections 422 in FIG. 4 are arranged in the configuration of a bristle brush (for example a portion of the bristles 420 are grouped in each bristle section 422 and each of the bristles 420 extends radially outwardly perpendicular to the longitudinal axis D of the flexible pig 400) such that only one end of each bristle 420 is used for cleaning the process equipment. It is also contemplated that the bristles 420 extend through the entire diameter of the axial portion 412 of the flexible pig 400 such that both ends of such bristles extend out of the flexible body 410 for cleaning the process equipment.

Each of the bristles 420 in FIG. 4 has a diameter of about 5, 4, 3, 2, 1, 0.5, or less millimeters (about 0.20, 0.16, 0.125, 0.08, 0.05, 0.016 or less inches). The bristles 420 may be made of a metal, polymer, or natural materials. Examples of metal materials for the bristles 420 include stainless steel higher than 304 stainless steel, such as 316 stainless steel and 321 stainless steel, and brass. An example of a polymer material for the bristles 420 includes nylon (including nylon-6, nylon-6,6 and nylon-6,12), polyester, PEEK, polyethylene, and polypropylene. Examples of natural materials for the bristles 420 include Tampico, Palmyra, and Palmetto. It is contemplated that a portion of the bristles 420 is metal and another portion of the bristles 420 is nylon. For example, one of the bristle sections 422 may have nylon bristles while the other bristle sections 422 may have metal bristles. It is also contemplated that a single bristle section 422 may have one or more of metal bristles, polymer bristles, natural bristles, or any combination thereof. In aspects of the disclosure, the bristles 420 include no iron.

In FIG. 4, each of the bristle sections 422 takes the shape/form of the axial portion 412, and each of the bristles 420 extends radially outwardly from and perpendicular to the longitudinal axis D of the flexible pig 400. In aspects of the disclosure, the length of the bristle sections 422 (as measured along the longitudinal axis D) may be from about 0.5 inches to about 5 inches (about 12.7 millimeters to about 127 millimeters). In FIG. 4, the length of the bristle sections 422 is greater than the length of the radial portions 414. Each of the bristle sections 422 has the same length, as measured along axis D; however, it is contemplated that the bristles 420 may be arranged in sections in which at least one section has a different length relative to at least another section. Moreover, each of the bristle sections 422 has the same bristle configuration (for example a brush); however, it is contemplated that the bristles 420 may be arranged in various configurations among the bristle sections 422 of the flexible pig 400 (for example spiral coil or brush configuration, rotary wheel or brush configuration, or combinations thereof). Each of the voids 416 has the same length, as measured along axis D; however, it is contemplated that at least one of the voids 416 has a length which is different relative to a length of at least another void 416.

In aspects of the disclosure, a metal protective layer is present on at least a portion of at least one of the bristles 420. The metal protective layer of the bristle(s) 420 may be the same as or different than the metal protective layer of the internal surface of the process equipment. Generally, the metal protective layer (MPL) is formed by applying one or more metals or metal-containing compounds to a bristle to form an applied metal layer (AML), which may be subsequently cured to form the MPL. Techniques for applying the AML and curing to form the MPL are described in detail below. The MPL of bristles 420 for flexible pig 400 includes the same characteristics as described for the MPL of bristles 120 of flexible pig 100. Including a MPL on the bristles 420 allows for the bristles 420 to apply small amount of protective metal to the internal surface(s) of the process equipment in addition to removing coke deposits (for example, coke blooms) without damaging the metal protective layer of the process equipment internal surface(s).

As may be seen in FIG. 4, the flexible pig 400 does not include a flexible cable because the flexible body 410 is a single piece of molded polymer. However, it is contemplated that a central linkage may be present in the flexible pig 400. The central linkage may anchor the bristles 420 in the flexible pig 400. The central linkage may be completely encapsulated in the polymeric material of flexible body 410 and may extend within the axial portion 412 along the longitudinal axis C of the flexible pig 400 from end 402 to opposite end 404 of the flexible pig 400. The central linkage may be a chain, or any other means for anchoring the bristles 420 within the flexible body 410. For example, the central linkage may also be embodied as the flexible cable of FIGS. 1 and 2, except the bristles 420 are anchored/attached to the flexible cable. In other aspects of the disclosure, the flexible cable may be utilized to improve the rigidity of the flexible body 410, with or without anchoring the bristles 420 to the flexible cable.

Because the flexible body 410 of the flexible pig 400 is itself made from a molded polymeric material and does not include a flexible cable, there is no need for encapsulating the ends 402 and 404 of the flexible pig 400 in the polymeric material or to use a polymeric end cap. In aspects of the disclosure of the flexible pig 400 which utilize a flexible cable, end caps may be utilized in the same manner as described herein for flexible pigs 100 and/or 200.

Figure 5:
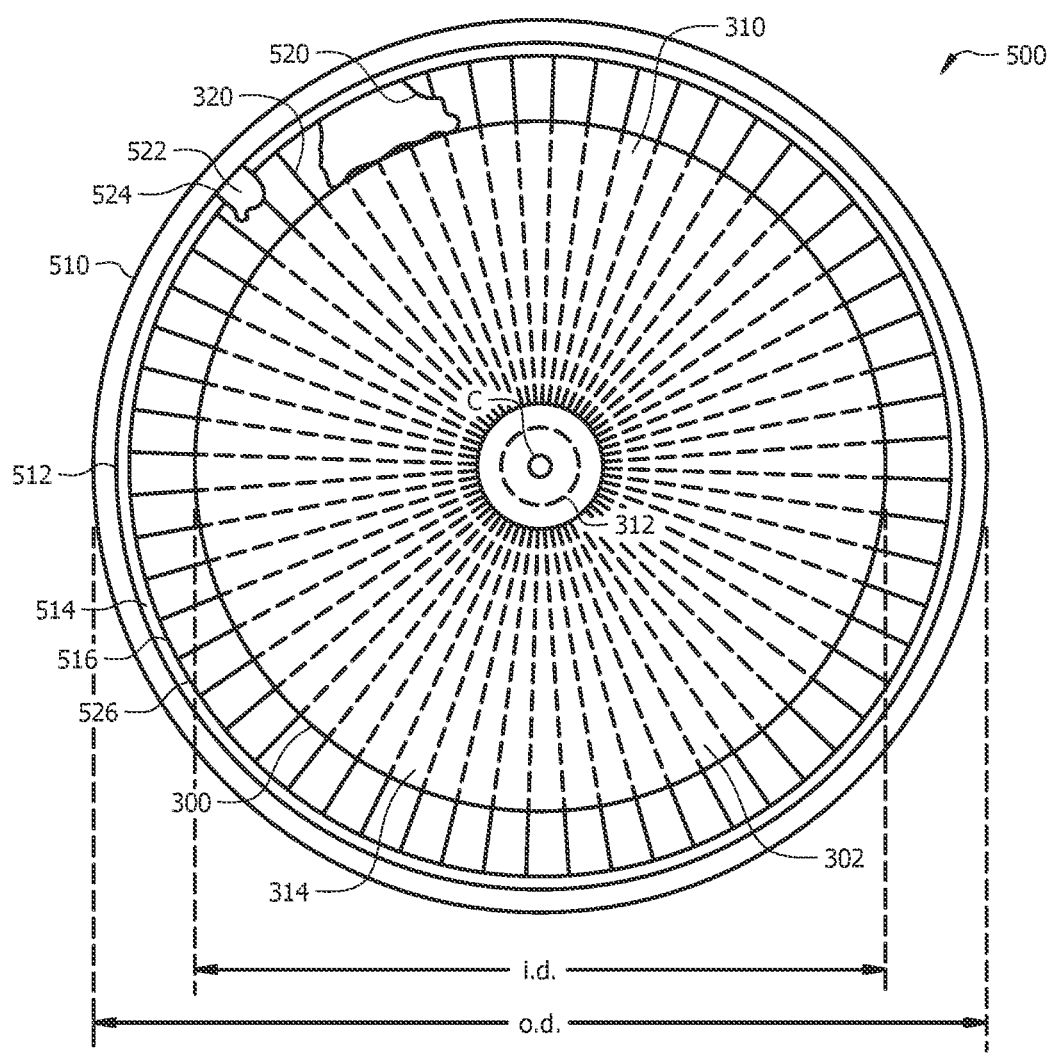
FIG. 5 is an end view of the flexible pig of FIG. 3, in a furnace tube which has contacted a coke bloom.

FIG. 5 shows an example of a coke cleaning system 500. Particularly, FIG. 5 shows an end view of the flexible pig 300 of FIG. 3, placed in a furnace tube 510 which has coke blooms 520 and 522. The flexible pig 300 is placed in the furnace tube 510 such that the bristles 320 contact the internal surface 516 of the furnace tube 510.

The furnace tube 510 is from a catalytic reforming reactor, and the furnace tube 510 has a stannide protective layer 514 of an inner surface 512 of the furnace tube 510, making the inner surface 526 of the metal protective layer 514 the internal surface 516 of the furnace tube 510 from which the coke bloom 520 is cleaned. It can be seen that the stannide protective layer 514 is missing where coke bloom 522 has formed, thus making the inner surface 512 of the furnace tube 510 the internal surface 524 from which the coke bloom 522 is cleaned.

It may be seen the bristles 320 each have at least a portion (shown in dashed lines) partially encapsulated by the polymeric material of the radial portion 314 of the flexible body 310 on the end 302 of the flexible pig 300. In the flexible pig 300, the bristles 320 are partially encapsulated in the polymeric material of the axial portion 312 (drawn with dashed lines) of the flexible body 310. The bristles 320 each extend radially outwardly in a direction perpendicular to the longitudinal axis C of the flexible pig 300. While in the flexible pig 300 shown in FIG. 5, the encapsulated portion bristles 320 extend to near the an axial portion 312m, however it is contemplated that the encapsulated portion of the bristles 320 may extend into the polymeric material of the flexible 320 only as far as necessary to securely anchor the bristles. The bristles 320 are placed around the entire circumference of the flexible body 310; however, it is contemplated that the bristles 320 may be placed in less than the entire circumference, for example, in spaced clusters around the circumference of the flexible body 310 (for example in the view of FIG. 5, spaced clusters may include bristles 320 placed in the flexible body 310 in areas ranging from 1 to 2 o'clock, 3 to 4 o'clock, 5 to 6 o'clock, 7 to 8 o'clock, 9 to 10 o'clock, and 11 to 12 o'clock, as an example).

It may also be seen the outer diameter, o.d., of the flexible pig 300 is less than the inner diameter, i.d., of the furnace tube 510. The distance between the outer surface of the flexible body 310 of the flexible pig 300 and the interior surface 516 of the furnace tube 510 is exaggerated in FIG. 5 for clarity, and the distance may be less, for example, from about 5 millimeters to about 15 millimeters (about 0.20 inches to about 0.59 inches).

The bristles 320 bend against the interior surface 516 of the furnace tube 510. Although FIG. 5 shows the bristles 320 bending all in the same direction, each of the bristles 320 may bend in any direction depending upon the direction of the fluid force applied to the pig 300 (either into the page or out of the page along the longitudinal axis C) and upon any rotation of the pig 300 clockwise or counterclockwise in the furnace tube 510.

Although not shown in FIG. 5, a fluid source provides a fluid force of less than about 60 psig (413.7 kPa) to one of the ends of the flexible pig 300 (for example the end 302 of the flexible pig 300 shown in FIG. 5 and FIG. 3 or opposite end 304 of the flexible pig 300 shown in FIG. 3) in the direction of the longitudinal axis C, causing at least one of the bristles 320 of the flexible pig 300 to contact coke bloom 520 and coke bloom 522 without damaging the metal protective layer 514 of the internal surface 516 of the furnace tube 510.

Also disclosed herein are methods for cleaning a coke deposit (for example a coke bloom) from an internal surface of a process equipment. The methods may be performed using aspects of the disclosure of the process equipment and flexible pig 100, 200, 300, or 400 disclosed herein. The method generally includes (i) removing at least a portion of the coke deposit from the internal surface using a flexible pig comprising bristles, without damaging a metal protective layer of the internal surface of the process equipment; (ii) after the step of removing, performing intelligent pigging to determine a condition of the internal surface of the process equipment; (iii) reapplying a protective metal to any portion of the internal surface having less than a threshold thickness of the metal protective layer; (iv) transferring at least a portion of the metal protective layer of the at least one of the bristles onto the internal surface of the process equipment; or (v) combinations thereof.

The step of removing may include (a) placing the flexible pig in the process equipment such that the bristles of the flexible pig are in contact with the coke deposit and/or the metal protective layer of the internal surface; (b) providing a fluid force against an end of the flexible pig; (c) contacting the coke deposit with at least one of the bristles; or (d) combinations thereof.

The flexible pig may be placed in the process equipment via any technique known in the art with the aid of this disclosure. For example, the flexible pig may be manually placed in the process equipment, or the flexible pig may be delivered to the process equipment using a pig delivery apparatus (described in more detail below). The manner of placement may be the same as or similar to that shown in FIG. 5.

The fluid force may be provided by a fluid delivery system which utilizes a fluid stored and then pumped under pressure by the fluid source to deliver the flexible pig into the process equipment. The fluid source also provides the fluid force against the flexible pig while the flexible pig is inside the process equipment such that bristles of the flexible pig contact the coke deposit. In aspects of the disclosure, the fluid force is provided at a pressure less than about 60 psig (413.7 kPa). In aspects of the disclosure, the fluid force is provided at a pressure of about 30 psig (206.9 kPa). In aspects of the disclosure where the fluid force is provided at less than 60 psig (413.7 kPa), the fluid force is provided at a tolerance of a pressure spike up to about 60 psig (413.7 kPa).

The fluid source may include a fluid, a circulation tank for holding a suitable amount of the fluid, a pump connected to the circulation tank. The fluid source is connected to a fluid force delivery system. Fluid force delivery system may comprise suitable piping to connect to the process equipment such that the flexible pig may be delivered from the apparatus into the process equipment and recovered into the apparatus from the process equipment.

The step of contacting the coke deposit with at least one of the bristles of the flexible pig involves contacting the bent end of at least one of the bristles with the coke deposit. The location of the coke deposit(s) on the internal surface of the process equipment in combination with the movement of the flexible pig through the process equipment induces the contact between the bristles and the coke deposit(s). The lateral movement of the flexible pig through the process equipment provides a shear force, which in combination with the radial force of the bent end of each bristle against the internal surface of the process equipment and against the coke deposit, loosens and removes the coke deposit(s). The removed coke particles are washed away from the flexible pig by the fluid.

The step of performing intelligent pigging may include any technique for intelligent pigging known in the art with the aid of this disclosure, such as those disclosed in U.S. Pat. No. 8,894,772 B2 and U.S. Patent Application Publication Nos. 2002/0011124 A1 and 2014/0013872 A1, each of which are incorporated herein by reference. Data analysis for any data collected in intelligent pigging may be performed by any technique known in the art with the aid of this disclosure, such as those disclosed in U.S. Pat. No. 7,542,874, which is incorporated herein by reference.

The step of reapplying a protective metal may include any protective metal application technique known in the art with the aid of this disclosure, including those techniques disclosed for application of the protective metal in the patents incorporated by reference herein. The portion of the internal surface to which the protective metal is reapplied may be an area of the internal surface in which the thickness of the metal layer has been eroded and/or compromised due to process operation. The reapplication of the protective metal may restore the area to a restored thickness suitable for process operation. The threshold thickness of the metal protective layer of the internal surface of the process equipment may be from about 1 mil (25 μm) to about 100 mils (2.5 mm). The restored thickness of the metal protective layer may be from about 1 mil (25 μm) to about 100 mils (2.5 mm). The step of reapplying may be distinguishable from any protective metal application by the flexible pig itself, which is accomplished in the step of transferring at least a portion of the metal protective layer of the bristles onto the internal surface of the process equipment.

The step of transferring transfers protective metal which is on the bristles of the flexible pig in the form of a metal protective layer (MPL) onto the internal surface of the process equipment. Before placing the flexible pig in the process equipment, a protective metal is applied to the bristles in the form of an applied metal layer (AML) and cured to form the MPL on the bristles.

Application of the AML involves applying one or more metals or metal-containing compounds (as described herein) to a bristle via plating, painting, cladding, coating or other technique for applying the metals or metal-containing compounds known in the art with the aid of this disclosure. In aspects of the disclosure, the AML is formulated to be applied as a coating. Suitable methods of applying the AML to one or more of the bristles as a coating include without limitation spraying, brushing, rolling, dipping, soaking, pickling, or combinations thereof. Devices for applying the AML to the bristles are known to one of ordinary skill in the art. The AML may be applied as a wet coating with a thickness of from about 1 mil (25 μm) to about 100 mils (2.5 mm), alternatively of from about 2 mils (51 μm) to about 50 mils (1.3 mm) per layer. Multiple applications (e.g., multiple coats) of the AML may be utilized as needed, for example, to impart a desired thickness or a desired hardness of the subsequently formed MPL. The AML may have viscosity characteristics sufficient to provide a substantially continuous coating of measurable and substantially controllable thickness.

An AML applied to a bristle as a wet coating may dry by evaporation of the solvent or other carrier liquid to form a dry coating that may be suitable for handling. In some aspects of the disclosure, the AML may have a tacky or gummy consistency that is resistant to cracking when the flexible pig is subsequently handled, for example, for curing of the AML to form the MPL. In aspects of the disclosure, the AML may dry about instantaneously upon contacting the bristle; alternatively, the AML may dry in less than about 48 hours from the time the AML contacts the bristle. In some aspects of the disclosure, a drying device may be used to facilitate removal of the solvent to form a dry coating, such as forced air or other drying means. Suitable drying devices are known to one skilled in the art.

An AML applied to a bristle as a wet coating may be further processed in addition to, in lieu of, or in conjunction with drying to provide an MPL. Examples of further processing of the AML to form the MPL include but are not limited to curing and/or reducing, discussed below. In aspects of the disclosure, the AML may be applied to one or more bristles as a coating that dries to form a coating, which may be further cured and/or reduced to form the MPL.

In aspects of the disclosure, the coating may be sprayed onto at least one of the bristles. Sufficient amounts of the coating should be applied to provide a continuous coating on the bristle. After a bristle is sprayed, it may be left to dry for about 24 hours and may be further processed by application of a slow stream of gas. In various aspects of the disclosure, the gas may be an inert gas, an oxygen containing gas, or combinations thereof. Non-limiting examples of gases include air, nitrogen, helium, argon, or combinations thereof. The gas may be heated. In aspects of the disclosure, the gas may be nitrogen at about 150° F. (66° C.) and may be applied for about 24 hours. Thereafter, a second coating layer may be applied to the reactor system component and may be dried by the procedure described above. After the AML has been applied, the AML on at least one of the bristles may be protected from oxidation by the introduction of a nitrogen atmosphere and should be protected from exposure to water using methods known to one of skill in the art.

The bristles may be heated after application of the AML to cure the AML on the bristles to form the MPL. Curing the AML may result in some degree of the metal of the AML reacting and/or bonding with the respective bristle to form the MPL that is completely bonded to the bristle or that has a bonding level which allows the MPL to adequately adhere to the bristles while allowing portions of the MPL to transfer to the internal surface of the process equipment as the flexible pig moves through the process equipment.

In aspects of the disclosure, the AML may be cured at any temperature and pressure compatible with maintaining the structural integrity of the bristles. In aspects of the disclosure, the AML may be cured at a temperature of from about 550° F. (288° C.) to about 1,400° F. (760° C.), alternatively of from about 650° F. (343° C.) to about 1,350° F. (732° C.), alternatively of from about 700° F. (371° C.) to about 1,300° F. (704° C.), alternatively, about 980° F. (527° C.) to about 1,000° F. (538° C.), alternatively, about 565° F. (296° C.) to about 580° F. (304° C.). The heating may be carried out for a period of time from about 1 hour to about 150 hours, alternatively from about 5 hours to about 130 hours, alternatively from about 10 hours to about 120 hours.

In aspects of the disclosure, the AML may be cured at or above atmospheric pressure in a range of from about atmospheric pressure to about 215 psia (1,482 kPa), alternatively from about 20 psia (138 kPa) to about 165 psia (1,138 kPa), alternatively from about 25 psia (172 kPa) to about 115 psia (793 kPa).

In aspects of the disclosure, the AML may be cured at sub-atmospheric pressures. Without wishing to be limited by theory, curing the AML at sub-atmospheric pressures may allow for the use of elevated temperatures that promote the rapid and nearly complete conversion of the AML to the MPL. The curing may be performed at sub-atmospheric pressures of from about atmospheric pressure to about $1.9 \times 10^{-5}$ psia (0.13 Pa), alternatively of from about 14 psia (97 kPa) to about $1.9 \times 10^{-4}$ psia (1.3 Pa), alternatively of from about 10 psia (69 kPa) to about $1.9 \times 10^{-3}$ psia (13 Pa). Under these conditions, formation of an MPL having the desired properties may occur in a period of from about 1 hour to about 150 hours.

In aspects of the disclosure, the AML may be cured under reducing conditions. Curing the AML under reducing conditions may facilitate conversion of the AML to an MPL. Suitable reducing agents depend on the metal in the AML and are known to one of ordinary skill in the art, for example, in the presence of a reducing gas (hydrogen, carbon monoxide, hydrocarbons, or combinations thereof, optionally blended with a blending gas selected from one or more of argon, helium, nitrogen, and any inert gas) in a concentration of about 100 vol %, alternatively about 90 vol %, alternatively about 80 vol %, alternatively about 75 vol %, alternatively about 50 vol %, alternatively about 25 vol % with any balance made up with the blended gas.

The thickness of the protective metal (in the form of the MPL) deposited on each of the bristles may be from about 1 mil (25 µm) to about 100 mils (2.5 mm). Permanent adherence and/or alloying of the protective metal to the bristles is not needed since transfer of the protective metal from the bristles to the process equipment is desired. The protective metal on the bristles is transferred to the internal surface of the process equipment via frictional contact of the bristles with the internal surface of the process equipment.

The AML can be applied to at least one of the bristles of a flexible pig before or after the flexible pig is assembled. For example, an AML and resulting MPL can be formed on bristles before the bristles are placed in bristle sections on a flexible cable or before the bristles are partially encapsulated in a polymeric flexible body. Alternatively, the AML and resulting MPL can be formed on bristles after the flexible pig is assembled. For example, the bristles of the flexible pig can be coated with AML and then cured to form the MPL on the bristles. For flexible pigs having 1) a polymeric flexible body and 2) the AML (and resulting MPL) applied to one or more bristles partially encapsulated in the polymeric flexible body, each bristle having an AML and resulting MPL has: i) a portion of the bristle which is completely encapsulated in the polymeric flexible body and which has no AML and no MPL, ii) another portion of the bristle which is coated in AML and the resulting MPL and which is not encapsulated in the polymeric flexible body, and optionally, iii) a third portion which is not encapsulated and not coated with an AML and resulting MPL.

Aspects of the disclosed method may include, prior to removing the coke deposit, identifying hot spots comprising a coke deposit and/or a coke deposit on one or more internal surfaces of the process equipment. The step of identifying may be performed using any technique known in the art with the aid of this disclosure, such as infrared (IR) thermal imaging and/or boroscoping.

The method may include, after intelligent pigging, drying the internal surface of the process equipment, for example, using forced air passed through the process equipment over the internal surface.

Typical decoking techniques involve staged progression of stiffer and stiffer bristles of a pig to remove coke deposits and coke blooms at the expense of removing the metal protective layer of the process equipment in addition to coke removal. The disclosed aspects improve upon these typical techniques because the metal protective layer is not damaged during coke removal.

In aspects of the disclosure, the bristles disclosed herein bend and/or flex when in contact with the internal surface of the process equipment. In aspects of the disclosure, the flexible pigs described herein are designed so that the tips of the bristles do not scrape the internal surfaces. These bristles are also referred to herein as bendable bristles. Because the tips of the bendable bristles do not contact the internal surface, the flexible pig of the disclosed aspects of the disclosure does not scrape the internal surfaces, and the metal protective layer included on the internal surface is not damaged. The bending of the ends of the bendable bristles creates a smooth rounded surface which contacts the internal surface of the process equipment, thus scraping does not occur via the bristle tips. Moreover, the bending of the ends of the bendable bristles against the internal surface of the process equipment creates a larger contact area for each bendable bristle compared to bristles which are not bendable. Moreover still, the bendable bristles are not pre-bent before placing the flexible pig into the process equipment. The bendable bristles bend in response to contact with the internal surface of the process equipment. In additional aspects of the disclosure, the bendable bristles may be resilient and may unbend when removed from contact with the internal surface of the process equipment.

The disclosed aspects of the disclosure also operate at low pigging pressures. Traditional pig decoking techniques utilize fluid force pressures of 500 psig (3.45 MPa) to 1,000 psig (6.89 MPa). In contrast, the techniques and flexible pigs disclosed herein utilize a fluid force of less than about 60 psig (413.7 kPa). As such, the fluid source and fluid force delivery equipment necessary for high pressure pig decoking is not necessary with the disclosed aspects. Operating at lower pressures is safer and reduces the pressure specifications for equipment used in the cleaning.

Flow of the fluid used with the disclosed flexible pigs is about three times the volume used for traditional scraper pigs. The larger fluid flow provides a greater amount of fluid to flush removed coke particles away from the area being treated by the flexible pig.

Aspects of the disclosed flexible pigs which include a metal protective layer on one or more bristles may recoat the protective metal (e.g., microscopic tin) onto the internal surface of the process equipment and thus reinforce the metal protective layer of the process equipment and/or transfer the protective metal to areas of the internal surface where the metal protective layer has eroded or has been compromised by the coke deposits. That is, the flexible pigs disclosed herein serve the dual function of cleaning coke deposits from the internal surface of the process equipment and recoating the cleaned internal surface with the protective metal. As such, reapplication of the protective metal (via transfer from the bristles of the flexible pig) occurs in the same step as cleaning. In some cases, a separate step for reapplying the protective metal to the internal surface of the process equipment may not be needed.

In aspects of the disclosure having a metal protective layer on the bristles, the bristles are designed to be soft enough to not scratch the internal surface which come into contact with the bristles, for example, via a hardness which is less than or equal to the hardness of the internal surface of the process equipment.

Curing/reducing an applied metal layer of the bristles can occur at temperatures of less than 1000° F. (538° C.) in which stannide formation is very slow and therefore incomplete, while leaving a thick resulting metal protective layer in a reduced state and no longer having a free-flowing liquid from the applied metal layer.

Cleaning coke deposits utilizing the flexible pigs disclosed herein reduces the cleaning time. For example, cleaning the furnace tubes of a catalytic reforming reactor may take more than six days for a single furnace tube using traditional decoking pigs and techniques. Utilizing a flexible pig, an entire collection of furnace tubes within one furnace within a catalytic reforming reactor system, containing fifty-four furnace tubes, may be decoked during a single 12-hour shift. That is, the aspects disclosed herein cleaned coke deposits from a single furnace tube in an average time of about 13 minutes. Thus, the time for cleaning the process equipment (for example a furnace tube) may be reduced by utilizing the aspects disclosed herein.

Utilizing aspects of the disclosed flexible pig in which the overall length of the flexible pig is greater than the path length of a transition zone of the process equipment prevents the flexible pig from being stuck in the transition zone.

The disclosed aspects also remove other debris and catalytic cake from the internal surface of the process equipment without damaging the internal surface.

The disclosed aspects also effectively clean in crevices (for example as found in welds) of the process equipment where coke deposits and other debris may accumulate.

Additional Description

Aspects of the disclosed methods for cleaning process equipment have been described. The following are a first set of nonlimiting, specific aspects in accordance with the present disclosure:

The first aspect of the disclosure is a method for cleaning a coke deposit from an internal surface of a process equipment, comprising:

removing at least a portion of the coke deposit from the internal surface using a flexible pig comprising a plurality of bristles, without damaging a metal protective layer of the internal surface of the process equipment.

The second aspect of the disclosure is the method of the first aspect, wherein the step of removing comprises:

placing the flexible pig in the process equipment such that the plurality of bristles of the flexible pig are in contact with the internal surface;

providing a fluid force against an end of the flexible pig; and contacting the coke deposit with at least one of the plurality of bristles.

The third aspect of the disclosure is the method of any of the first through the second aspects, further comprising:

after the step of removing, performing intelligent pigging to determine a condition of the internal surface of the process equipment; and reapplying a protective metal to any portion of the internal surface having less than a threshold thickness of the metal protective layer.

The fourth aspect of the disclosure is the method of any of the first through the third aspects, wherein the protective layer protecting the internal surface comprises a stannide.

The fifth aspect of the disclosure is the method of any of the first through the fourth aspects, wherein the process equipment comprises a furnace tube.

The sixth aspect of the disclosure is the method of any of the first through the fifth aspects, wherein the flexible pig comprises at least two foam spacers, wherein the plurality of bristles are provided in at least two bristle sections, and wherein the at least two bristle sections are separated by one of the at least two foam spacers.

The seventh aspect of the disclosure is the method of any of the first through the sixth aspects, wherein the flexible pig comprises a molded polymeric body formed of a polymeric material, and wherein at least a portion of each of the plurality of bristles is partially encapsulated by the polymeric material of the molded polymeric body.

The eighth aspect of the disclosure is the method of any of the first through the seventh aspects, wherein the pig has a metal protective layer on at least one of the plurality of bristles.

The ninth aspect of the disclosure is the method of the eighth aspect, further comprising:

transferring at least a portion of the metal protective layer on the at least one of the plurality of bristles onto the internal surface of the process equipment, wherein the metal protective layer on the at least one of the bristles comprises a stannide.

The tenth aspect of the disclosure is a flexible pig for cleaning a coke deposit from an internal surface of a process equipment without damaging a metal protective layer of the internal surface, comprising:

a flexible body formed of a polymeric material; and
a plurality of bristles partially encapsulated by the polymeric material of the flexible body.

The eleventh aspect of the disclosure is the flexible pig of the tenth aspect, wherein at least one of the plurality of bristles comprises a metal protective layer containing stannide.

The twelfth aspect of the disclosure is the flexible pig of any of the tenth through eleventh aspects, wherein the flexible body comprises:

at least one cylindrically-shaped foam spacer; and
a flexible cable extending along a longitudinal axis of the flexible pig and through the at least one cylindrically-shaped foam spacer, the flexible cable having an end anchored to an end of the flexible pig and an opposite end anchored to an opposite end of the flexible pig.

The thirteen aspect of the disclosure is the flexible pig of the twelfth aspect, wherein the plurality of bristles are provided in at least one cylindrically-shaped bristle section in which each of the plurality of bristles extends radially outward from the longitudinal axis of the flexible pig, wherein an end of the cylindrically-shaped foam spacer is in contact with an end of the at least one cylindrically-shaped bristle section.

The fourteenth aspect of the disclosure is the flexible pig of the thirteenth aspect, wherein the plurality of bristles of the at least one cylindrically shaped bristle section are in a spiral configuration, a rotary brush configuration, a rotary wheel configuration, or a combination of spiral, rotary brush, and rotary wheel configurations.

The fifteenth aspect of the disclosure is the flexible pig of any of the twelfth through the fourteenth aspects, wherein the flexible cable is made of a material comprising polymer, steel, or a combination polymer and steel, wherein the at least one cylindrically-shaped foam spacer is made of a closed-cell foam, and wherein the plurality of bristles are polymer bristles, steel bristles, or a combination of polymer bristles and steel bristles.

The sixteenth aspect of the disclosure is the flexible pig of any of the tenth through the fifteenth aspects, wherein the flexible body comprises:

a molded polymeric body formed of a polymeric material, wherein at least a portion of each of the plurality of bristles are partially encapsulated by the polymeric material of the molded polymeric body.

The seventeenth aspect of the disclosure is the flexible pig of the sixteenth aspect, wherein the molded polymeric body comprises an axial portion and a plurality of radial portions formed in spaced intervals along the axial portion, and wherein a diameter of the axial portion is less than an outer diameter of each of the plurality of radial portions.

The eighteenth aspect of the disclosure is the flexible pig of the seventeenth aspect, wherein the at least a portion of each of the plurality of bristles that are partially encapsulated by the polymeric material of the molded polymeric body are in the axial portion, one of the plurality of radial portions, or a combination of the axial portion and the one of the plurality of radial portions.

The nineteenth aspect of the disclosure is the flexible pig of any of the sixteenth through the eighteenth aspects, wherein the plurality of bristles are polymer bristles, steel bristles, natural bristles or any combination of polymer bristles steel bristles or natural bristles.

The twentieth aspect of the disclosure is a system comprising:

a process equipment having a coke deposit formed on an internal surface comprising a metal protective layer;
a flexible pig placed in the process equipment, wherein the flexible pig comprises a flexible body formed of a polymeric material and a plurality of bristles partially encapsulated by the polymeric material, wherein the plurality of bristles contact the internal surface of the process equipment; and
a fluid source which provides a fluid force of less than about 60 psig to an end of the flexible pig causing at least one of the plurality of bristles of the flexible pig to contact the coke deposit without damaging the metal protective layer of the internal surface of the process equipment.

The twenty-first aspect of the disclosure is a method for cleaning a coke deposit from an internal surface of a process equipment, comprising:

aromatizing hydrocarbons in an aromatization reactor system to produce an aromatization product, wherein the aromatization reactor system comprises a furnace having a plurality of tubes disposed therein, wherein the internal surface of each of the plurality of tubes has a metal protective layer comprising stannide disposed thereon, and wherein coke deposits are formed on the metal protective layer of the internal surface of one or more of the plurality of furnace tubes;

halting the aromatizing and servicing the aromatization reactor system by removing at least a portion of the coke deposit from the internal surface using a flexible pig comprising a plurality of bristles, without damaging the metal protective layer of the internal surface of the furnace tubes;

optionally inspecting one or more of the plurality of furnace tubes via video inspection or ultrasonic gauging; and resuming aromatization of hydrocarbons in the aromatization reactor system.

While preferred aspects of the invention have been shown and described, modifications thereof may be made by one skilled in the art without departing from the spirit and teachings of the invention. The aspects described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the preferred aspects s of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for cleaning a coke deposit from an internal surface of a process equipment, the method comprising:
   propelling a flexible pig through the process equipment, wherein the flexible pig is propelled by a fluid comprising an aqueous solution; and
   removing at least a portion of the coke deposit from the internal surface using the flexible pig, without damaging a metal protective layer of the internal surface of the process equipment,
   wherein the flexible pig comprises:
      at least two foam spacers,
      at least two bristle sections, and
      a flexible cable extending along a longitudinal axis of the flexible pig through the at least two foam spacers and through the at least two bristle sections,
         wherein each of the at least two bristle sections comprises a plurality of bristles, and wherein the at least two bristle sections are separated by one of the at least two foam spacers.

2. The method of claim 1, wherein each of the at least two foam spacers comprises a closed-cell foam selected from polyethylene, cross-linked polyethylene, polypropylene, polystyrene, polyurethane, rubber, neoprene, copolymers thereof or combinations thereof.

3. The method of claim 1, wherein one of the at least two foam spacers is on an end of the flexible pig.

4. The method of claim 3, wherein another of the at least two foam spacers is on an opposite end of the flexible pig.

5. The method of claim 1, wherein a length of each of the foam spacers as measured along a longitudinal axis of the flexible pig is greater than a length of each of the bristle sections as measured along the longitudinal axis of the flexible pig.

6. The method of claim 1, wherein a ratio of length to diameter (L/D) of the flexible pig is from about 2:1 to about 6:1.

7. The method of claim 1, wherein the plurality of bristles in each of the at least two bristle sections are arranged in a configuration of a spiral bristle coil.

8. The method of claim 1, wherein the flexible pig has a metal protective layer on at least one of the plurality of bristles, the method further comprising:
   transferring at least a portion of the metal protective layer on the at least one of the plurality of bristles onto the internal surface of the process equipment, wherein the metal protective layer on the at least one of the bristles comprises a stannide.

9. The method of claim 1, wherein the plurality of bristles are polymer bristles, steel bristles, natural bristles or any combination of polymer bristles, steel bristles, or natural bristles.

10. The method of claim 1, wherein the step of removing comprises:
    placing the flexible pig in the process equipment such that the plurality of bristles of the flexible pig are in contact with the internal surface;
    providing a fluid force against an end of the flexible pig; and
    contacting the coke deposit with at least one of the plurality of bristles,
    wherein a fluid source provides the fluid force of less than about 60 psig to the end of the flexible pig causing at least one of the plurality of bristles of the flexible pig to contact the coke deposit.

11. The method of claim 1, further comprising:
    after the step of removing, performing intelligent pigging to determine a condition of the internal surface of the process equipment; and
    reapplying a protective metal to any portion of the internal surface having less than a threshold thickness of the metal protective layer,
    wherein the metal protective layer protecting the internal surface comprises a stannide.

12. A flexible pig for cleaning a coke deposit from an internal surface of a process equipment, the flexible pig comprising:
    the flexible pig comprises:
       at least two foam spacers,
       at least two bristle sections, and
       a flexible cable extending along a longitudinal axis of the flexible pig through the at least two foam spacers and through the at least two bristle sections,
          wherein each of the at least two bristle sections comprises a plurality of bristles, and wherein the at least two bristle sections are separated by one of the at least two foam spacers.

13. The flexible pig of claim 12, wherein each of the at least two foam spacers comprises a closed-cell foam selected from polyethylene, cross-linked polyethylene, polypropylene, polystyrene, polyurethane, rubber, neoprene, copolymers thereof, or combinations thereof.

14. The flexible pig of claim 12, wherein one of the at least two foam spacers is on an end of the flexible pig.

15. The flexible pig of claim 12, wherein another of the at least two foam spacers is on an opposite end of the flexible pig.

16. The flexible pig of claim 12, wherein a length of each of the foam spacers as measured along a longitudinal axis of the flexible pig is greater than a length of each of the bristle sections as measured along the longitudinal axis of the flexible pig.

17. The flexible pig of claim 12, wherein a ratio of length to diameter (L/D) of the flexible pig is from about 2:1 to about 6:1.

18. The flexible pig of claim 12, wherein the plurality of bristles in each of the at least two bristle sections are arranged in a configuration of a spiral bristle coil.

* * * * *